United States Patent
Kim et al.

(10) Patent No.: US 8,593,979 B2
(45) Date of Patent: Nov. 26, 2013

(54) METHOD AND APPARATUS FOR CONTROLLING UPLINK POWER IN A WIRELESS COMMUNICATION SYSTEM

(75) Inventors: Dong Cheol Kim, Suwon-si (KR); Wook Bong Lee, Sungnam-si (KR); Han Gyu Cho, Seoul (KR); Jin Sam Kwak, Gunpo-si (KR); Bin Chul Ihm, Anyang-si (KR); Hyun Woo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 651 days.

(21) Appl. No.: 12/836,531

(22) Filed: Jul. 14, 2010

(65) Prior Publication Data
US 2011/0026419 A1  Feb. 3, 2011

Related U.S. Application Data

(60) Provisional application No. 61/225,868, filed on Jul. 15, 2009, provisional application No. 61/254,210, filed on Oct. 23, 2009, provisional application No. 61/258,208, filed on Nov. 5, 2009, provisional application No. 61/287,208, filed on Dec. 17, 2009.

(30) Foreign Application Priority Data

Mar. 23, 2010  (KR) .................. 10-2010-0025643

(51) Int. Cl.
*G01R 31/08* (2006.01)

(52) U.S. Cl.
USPC ........... 370/252; 370/329; 370/328; 370/241; 455/522; 455/517

(58) Field of Classification Search
None
See application file for complete search history.

(56) References Cited

U.S. PATENT DOCUMENTS

| | | | |
|---|---|---|---|
| 2005/0208960 A1 | 9/2005 | Hassan | |
| 2006/0046789 A1 | 3/2006 | Huh et al. | |
| 2008/0225786 A1* | 9/2008 | Han et al. | 370/329 |
| 2009/0197632 A1* | 8/2009 | Ghosh et al. | 455/522 |
| 2010/0040088 A1* | 2/2010 | Terry | 370/479 |

FOREIGN PATENT DOCUMENTS

WO  2009/075548  6/2009

* cited by examiner

*Primary Examiner* — Anez Ebrahim
(74) *Attorney, Agent, or Firm* — Lee, Hong, Degerman, Kang & Waimey

(57) ABSTRACT

A method and apparatus for controlling uplink transmit power in a wireless communication system are disclosed. The method includes determining an uplink transmit power for each of the plurality of transmission channels, and sequentially allocating the determined uplink transmit powers to the transmission channels in a descending order of predetermined priority levels of the transmission channels, within a maximum available transmit power of the user equipment. The priority levels of the transmission channels are predetermined so that control channels, a sounding channel, a data channel, and a bandwidth request channel have priority levels in a descending order.

6 Claims, 9 Drawing Sheets

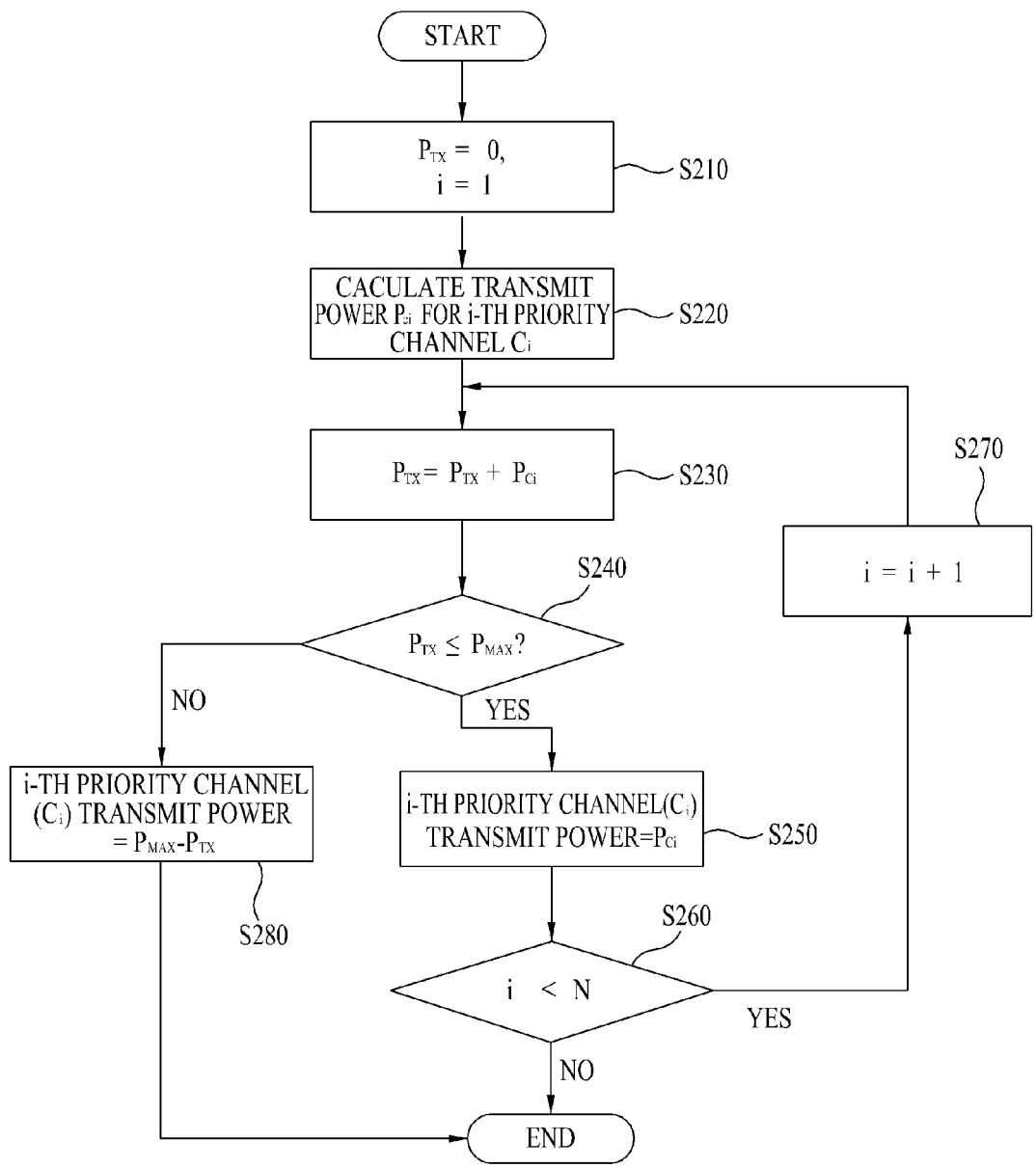

METHOD AND APPARATUS FOR CONTROLLING UPLINK POWER IN A WIRELESS COMMUNICATION SYSTEM

CROSS-REFERENCE TO RELATED APPLICATIONS

Pursuant to 35 U.S.C. §119, this application claims the benefit of earlier filing date and right of priority to Korean Patent Application No. 10-2010-0025643, filed on Mar. 23, 2010, and also claims the benefit of U.S. Provisional Application Ser. Nos. 61/287,208, filed on Dec. 17, 2009, 61/258, 208, filed on Nov. 5, 2009, 61/254,210, filed on Oct. 23, 2009, and 61/225,868, filed on Jul. 15, 2009, the contents of which are all incorporated by reference herein in their entirety.

BACKGROUND OF THE INVENTION

1. Field of the Invention

The present invention relates to wireless communication, and more particularly, to a method for controlling UpLink (UL) transmit power, when a plurality of UL transmission channels are transmitted simultaneously.

2. Background Art

Future-generation multimedia wireless communication systems, which are a recent active research area, require processing of various types of information including video data and wireless data at high data rates, beyond the traditional voice-oriented service.

Owing to its advantage of high data rate, Orthogonal Frequency Division Multiplexing (OFDM) has recently attracted much attention. OFDM is a special case of Multi-Carrier Modulation (MCM) in which a frequency band is divided into multiple orthogonal subcarriers and data is transmitted on the subcarriers. The low complexity of OFDM reduces inter-symbol interference. In OFDM, an input serial sequence of data symbols is converted to N parallel data symbols and transmitted on N separate subcarriers.

Orthogonality is maintained among the subcarriers in the frequency domain. Each orthogonal channel experiences mutually independent frequency-selective fading and the resulting increase in the gap between transmitted symbols leads to minimum inter-symbol interference. Orthogonal Frequency Division Multiple Access (OFDMA) is a multiple access scheme in which multiple accesses are allowed through independent allocation of part of available subcarriers to each user in an OFDM system. In OFDMA, it is typical to independently allocate frequency resources, namely subcarriers to a plurality of users in such a manner that the frequency resources are not overlapped with one another. As a result, allocation of frequency resources is mutually exclusive among users in OFDMA. The OFDMA system may achieve frequency diversity for multiple users by frequency selective scheduling and allocate subcarriers in various manners according to subcarrier permutation.

In some wireless communication systems, a UL control channel carrying a control signal from a User Equipment (UE) to a Base Station (BS) may be physically distinguished from a UL data channel carrying data from the UE to the BS. A plurality of control channels and/or data channels may be transmitted in one symbol. The transmit powers of UL transmission channels each may be determined using a predetermined equation.

In general, a maximum available transmit power is predetermined for UL transmission of a UE according to a bandwidth allocated to the UE, the throughput of the UE, the battery performance of the UE, etc. Hence, if a total transmit power required to transmit a plurality of transmission channels exceeds the maximum available transmit power of the UE, the UE may not transmit the plurality of transmission channels successfully.

Accordingly, there exists a need for a method for effectively allocating transmit power to a plurality of UL transmission channels that are to be transmitted simultaneously in different physical areas.

DISCLOSURE

Technical Problem

An object of the present invention devised to solve the problem lies on a method and apparatus for allocating transmit power to a plurality of UL transmission channels that are to be transmitted simultaneously.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

Technical Solution

The object of the present invention can be achieved by providing a method for controlling uplink transmit power of a plurality of transmission channels at a user equipment in a wireless communication system, the method comprising: determining uplink transmit power(s) for one or more transmission channels among the plurality of transmission channels within the maximum available transmit power ($P_{MAX}$) of the user equipment; and transmitting simultaneously the one or more transmission channels at each of the uplink transmit power(s) determined for the one or more transmission channels, wherein the uplink transmit power(s) is/are determined in a descending order of predetermined priority levels of transmission channels, and the priority levels are predetermined so that control channels, a sounding channel, a data channel, and a bandwidth request channel have priority levels in a descending order. In another aspect of the present invention, provided herein is a user equipment for controlling uplink transmit power of a plurality of transmission channels in a wireless communication system, the user equipment comprising: a transmitter configured to transmit signal; and a processor configured to control the transmitter, wherein the processor is configured to determine uplink transmit power(s) for one or more transmission channels among the plurality of transmission channels within the maximum available transmit power of the user equipment ($P_{MAX}$) of the user equipment, and configured to simultaneously transmit the one or more transmission channels at the uplink transmit power(s) determined for the one or more transmission channels, wherein the processor is configured to determine the uplink transmit power(s) in a descending order of predetermined priority levels of transmission channels, and the priority levels are predetermined so that control channels, a sounding channel, a data channel, and a bandwidth request channel have priority levels in a descending order. Transmission channels $C_1$ to $C_k$ that satisfy a condition expressed as the following equation among the plurality of transmission channels may be transmitted simultaneously at uplink transmit powers $P_{C_1}$ to $P_{C_k}$ determined for the transmission channels $C_1$ to $C_k$, $$\sum_{i=1}^{k} P_{Ci} \le P_{MAX}$$

where k is a largest integer satisfying the condition, $C_i$ denotes a transmission channel with an $i^{th}$ priority level, $P_{Ci}$ denotes an uplink transmit power determined for the transmission channel $C_i$.

A transmission channel with a $(k+1)^{th}$ priority level, $C_{k+1}$ may be transmitted at an uplink transmit power calculated by the following equation, along with the transmission channels $C_1$ to $C_k$, $$P_{C_{k+1}} = P_{MAX} - \sum_{i=1}^{k} P_{Ci}$$

If a transmission channel with a $(k+1)^{th}$ priority level, $C_{k+1}$ is a control channel, only the transmission channels $C_1$ to $C_k$ may be transmitted.

If the transmission channel with the $(k+1)^{th}$ priority level, $C_{k+1}$ is a data channel, the transmission channel $C_{k+1}$ may be transmitted at an uplink transmit power calculated by the following equation, along with the transmission channels $C_1$ to $C_k$, $$P_{C_{i+1}} = P_{MAX} - \sum_{i=1}^{k} P_{Ci}$$

Advantageous Effects

The method and apparatus for appropriately allocating UL transmit power according to the present invention enables a UE to stably transmit a plurality of UL signals.

It will be appreciated by persons skilled in the art that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 9 is a flowchart illustrating a method for allocating UL transmit power according to another embodiment of the present invention.

MODE FOR INVENTION

Reference will now be made in detail to the preferred embodiments of the present invention, examples of which are illustrated in the accompanying drawings.

Figure 1:
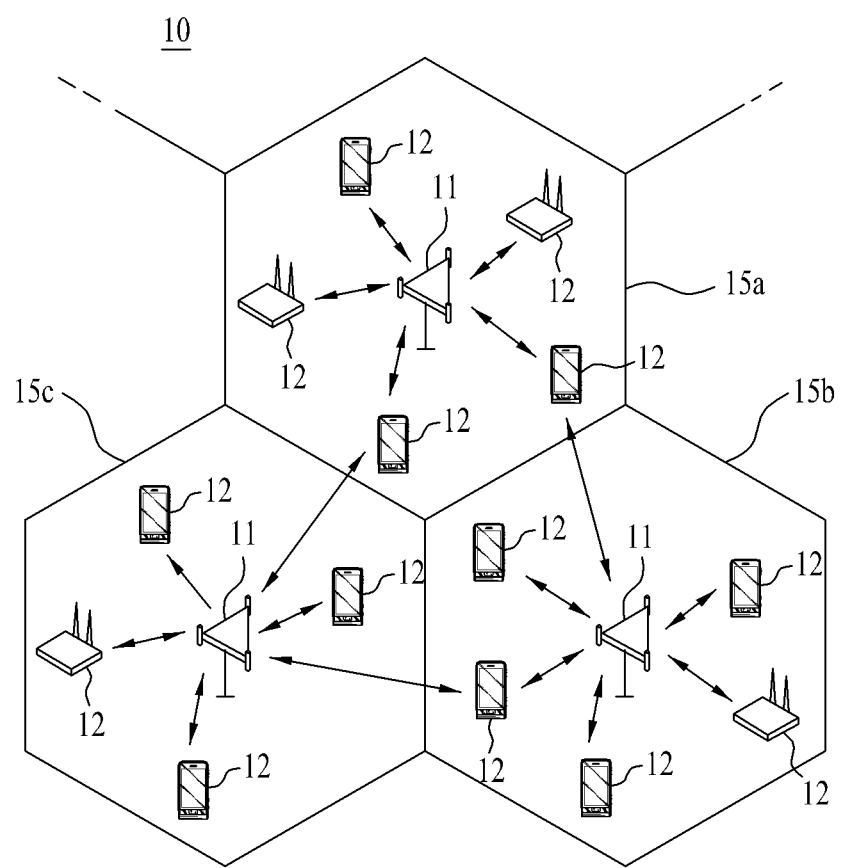
FIG. 1 is a block diagram of a wireless communication system.

FIG. 1 is a block diagram of a wireless communication system.

Referring to FIG. 1, a wireless communication system 10 includes at least one Base Station (BS) 11. Each BS 11 provides communication service to User Equipments (UEs) 12 within a specific geographical area (generally called a cell) 15a, 15b or 15c covered by the BS 11. The cell may be further divided into a plurality of areas called sectors. The UEs 12 may be mobile or fixed devices that transmit and receive user data and/or control information to and from the BS 11. The term "UE" is interchangeable with the terms "Mobile Station (MS)", "Mobile Terminal (MT)", "User Terminal (UT)", "Subscriber Station (SS)", "wireless device", "Personal Digital Assistant (PDA)", "wireless modem", "handheld device", etc. The BS 11 is usually a fixed station that communicates with the UEs 12 and/or another BS 11. Thus, the BS 11 exchanges data and control information with the UEs 12 and/or another BS 11. The term "BS" is used interchangeably with the terms "evolved Node B (eNB)", "Base Transceiver System (BTS)", "Access Point (AP)", etc.

A DownLink (DL) refers to a communication link directed from a BS 11 to a UE 12 and an UpLink (UL) refers to a communication link directed from a UE 12 to a BS 11. A transmitting device is a fixed and/or mobile node for providing data service or voice service and a receiving device is a fixed and/or mobile node that receives data service or voice service. The transmitting device may be part of the BS 11 and the receiving device may be part of the UE 12, on the DL, whereas the transmitting device may be part of the UE 12 and the receiving device may be part of the BS 11, on the UL.

A wireless communication system to which the present invention is applied is not limited to any particular multiple access scheme. Thus, a variety of multiple access schemes are available to the wireless communication system, such as Code Division Multiple Access (CDMA), Time Division Multiple Access (TDMA), Frequency Division Multiple Access (FDMA), Single-Carrier FDMA (SC-FDMA), and Orthogonal Frequency Division Multiple Access (OFDMA).

Figure 2:
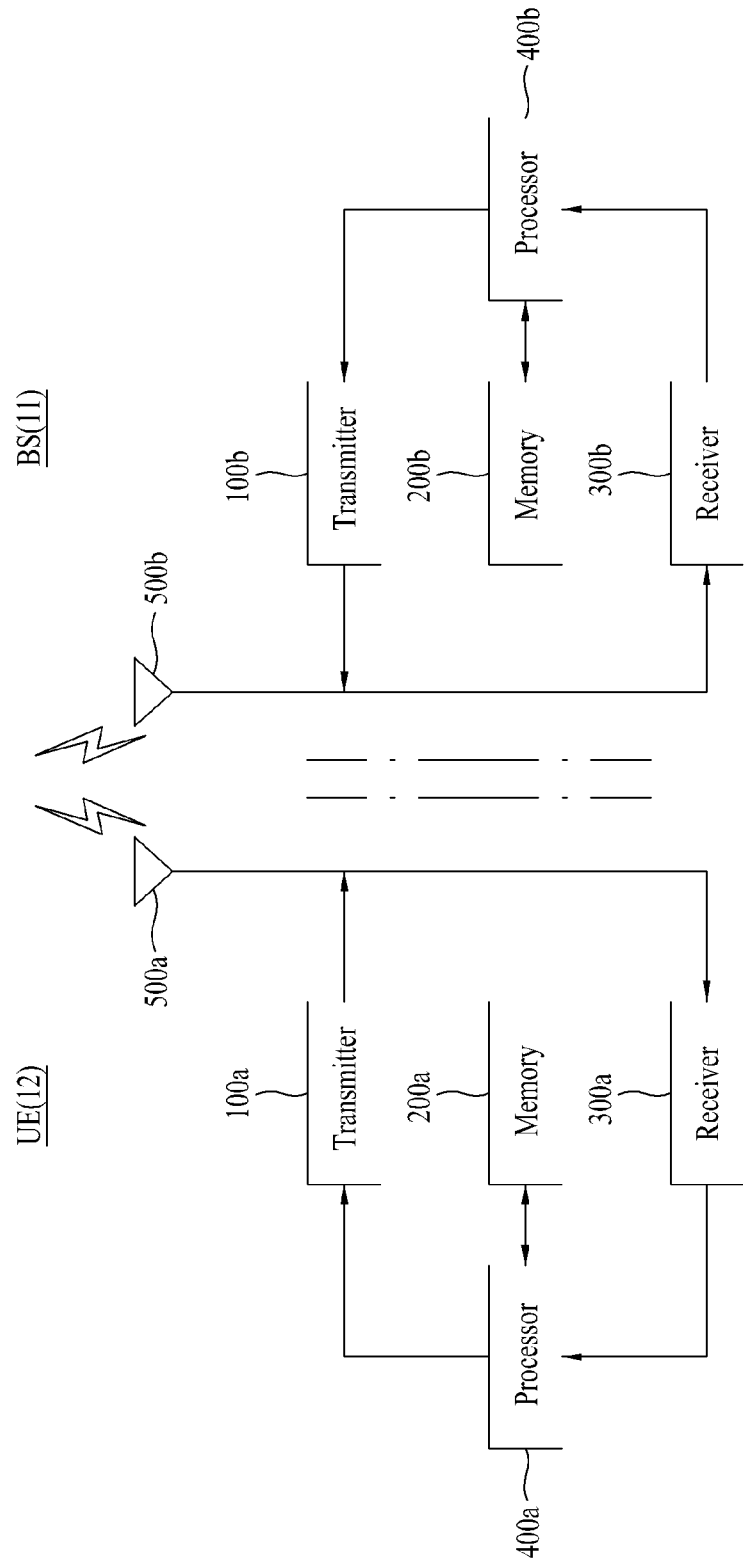
FIG. 2 is a block diagram of a User Equipment (UE) and a Base Station (BS) for implementing the present invention.

FIG. 2 is a block diagram of a UE 12 and a BS 11 for implementing the present invention.

As stated before, the UE 12 serves as a transmitting device on the UL and as a receiving device on the DL. The BS 11 may serve as a receiving device on the UL and as a transmitting device on the DL.

The UE 12 and the BS 11 include antennas 500a and 500b for transmitting and receiving information, data, signals, and/or messages, transmitters 100a and 100b for transmitting messages through the antennas 500a and 500b, receivers 300a and 300b for receiving messages through the antennas 500a and 500b, and memories 200a and 200b for storing information associated with communication in the wireless communication system. The UE 12 and the BS 11 further include processors 400a and 400b, respectively, which are adapted to perform the present invention by controlling the components of the UE 12 and the BS 11 including the transmitters 100a and 100b, the receivers 300a and 300b, and the memories 200a and 200b. The transmitter 100a, the memory 200a, the receiver 300a, and the processor 400a may be configured as independent components on separate chips or their separate chips may be incorporated into a single chip in the UE 12. Likewise, the transmitter 100b, the memory 200b, the receiver 300b, and the processor 400b may be configured as independent components on separate chips or their separate chips may be incorporated into a single chip in the BS 11.

The antennas 500a and 500b transmit signals generated from the transmitters 100a and 100b over the air, or output external wireless signals received over the air to the receivers 300a and 300b. If the transmitters 100a and 100b and the receivers 300a and 300b are implemented into transmission and reception modules that support Multiple Input Multiple Output (MIMO) using a plurality of antennas, each of them may be connected to two or more antennas.

The processors 400a and 400b generally provide overall control to the modules of the UE 12 and the BS 11. Especially, the processors 400a and 400b may carry out a control function for performing the present invention, a Medium Access Control (MAC) frame conversion control function based on service characteristics and a propagation environment, a power saving function for controlling idle-mode operations, a handover function, and an authentication and encryption function. The processors 400a and 400b may also be called controllers, microcontrollers, microprocessors, microcomputers, etc. The processors 400a and 400b may be achieved by hardware, firmware, software, or a combination thereof. In a hardware configuration, the processors 400a and 400b may be provided with one or more Application Specific Integrated Circuits (ASICs), Digital Signal Processors (DSPs), Digital Signal Processing Devices (DSPDs), Programmable Logic Devices (PLDs), and/or Field Programmable Gate Arrays (FPGAs), for implementing the present invention. In a firmware or software configuration, firmware or software may be configured to include a module, a procedure, a function, etc. performing functions or operations of the present invention. This firmware or software may be provided in the processors 400a and 400b, or may be stored in the memories 200a and 200b and invoked from the memories 200a and 200b by the processors 400a and 400b.

The transmitters 100a and 100b encode and modulate transmission signals and/or data scheduled by the processors 400a and 400b in a predetermined coding and modulation scheme and transmit the modulated signals and/or data through the antennas 500a and 500b. In addition, the transmitters 100a and 100b convert a transmission data stream to K signal streams by demultiplexing, channel coding, modulation, etc. The K signal streams are transmitted through the antennas 500a and 500b after being processed in transmission processors of the transmitters 100a and 100b.

Figure 3:
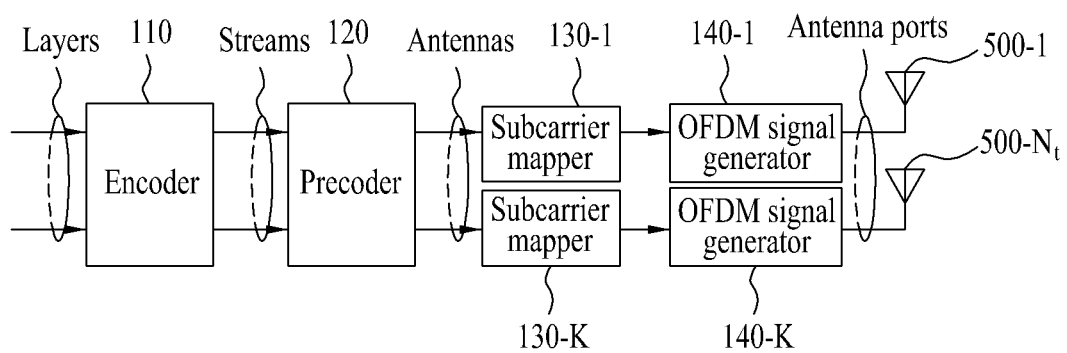
FIG. 3 is an exemplary block diagram of a transmitter in each of the UE and the BS.

FIG. 3 is an exemplary block diagram of a transmitter in each of the UE 12 and the BS 11. With reference to FIG. 3, operations of the transmitters 100a and 100b will be described below in great detail.

Referring to FIG. 3, each of the transmitters 100a and 100b includes an encoder 110, a precoder 120, subcarrier mappers 130-1 to 130-K, Orthogonal Frequency Division Multiplexing (OFDM) signal generators 140-1 to 140-K, and $N_t$ transmission antennas 500-1 to 500-$N_t$.

The encoder 110 encodes a transmission data stream to coded data in a predetermined coding scheme and maps the coded data to symbols representing positions on a signal constellation in a predetermined modulation scheme. The modulation scheme may be, but not limited to, any of m-Phase Shift Keying (m-PKS) and m-Quadrature Amplitude Modulation (m-QAM). For modulating the coded data, the encoder 110 may have an independent modulation module. In the mean time, the encoder 110 may define the layers of the input symbols such that the precoder 120 can distribute antenna-specific symbols to predetermined antenna paths. A layer refers to an information path leading to the precoder 120 and the information path before the precoder 120 may be referred to as a virtual antenna or layer. To define the layers of the symbols, the encoder 110 may be provided with a layer mapper configured as an independent module.

The precoder 120 processes the received symbols according to a MIMO scheme involving the transmission antennas 500-1 to 500-$N_t$ and thus outputs antenna-specific symbols to the subcarrier mappers 130-1 to 130-K. The precoder 120 is responsible for mapping the MIMO streams to antennas 500-1 to 500-$N_t$. Specifically, the precoder 120 multiplies the output x of the encoder 11 by an $N_t \times M_t$ precoder matrix W. The output of the precoder 120 may be represented as an $N_t \times N_F$ matrix z.

$$z = Wx = \begin{bmatrix} z_{1,1} & z_{1,2} & \cdots & z_{1,N_F} \\ z_{2,1} & z_{2,2} & \cdots & z_{2,N_F} \\ \cdots & \cdots & \cdots & \cdots \\ z_{N_t,1} & z_{N_t,2} & \cdots & z_{N_t,N_F} \end{bmatrix}$$

where $N_t$ denotes the number of transmission antennas, $z_{j,k}$ denotes a symbol to be transmitted on a $k^{th}$ subcarrier through a $j^{th}$ physical antenna. The precoder matrix W may be a matrix included in a preset codebook, signaled to the UE by the BS, may be selectively determined in the preset codebook according to a resource index, or may be selected or calculated suitably for an estimated DL reference signal. Instead of pre-defining a precoder matrix between the BS and the UE, the UE may set a precoder matrix on its own such that the precoder output becomes a stream for a single virtual transmission antenna.

The subcarrier mappers 130-1 to 130-K allocate the antenna-specific symbols to appropriate subcarriers and multiplex them according to users. The OFDM signal generators 140-1 to 140-K output OFDM symbols by subjecting the antenna-specific symbols to OFDM modulation. The OFDM signal generators 140-1 to 140-K may perform Inverse Fast Fourier Transform (IFFT) on the antenna-specific symbols and insert a Cyclic Prefix (CP) into the resulting IFFT time-domain symbol. The OFDM symbol is transmitted through the transmission antennas 500-1 to 500-$N_t$.

The receivers 300a and 300b decode and demodulate wireless signals received through the antennas 500a and 500b over the air and output the demodulated signals to the processors 400a and 400b. The antenna 500a or 500b connected to each of the receivers 300a and 300b may include N reception antennas. Signals received through the respective reception antennas are downconverted to baseband signals and recovered to an original data stream that the transmitter 100a or 100b transmitted, after multiplexing and channel demodulation. Therefore, each of the receivers 300a and 300b may have a signal recoverer for downconverting received signals to baseband signals, a multiplexer for multiplexing the baseband signals, and a channel demodulator for demodulating the multiplexed signal stream to a data stream. The signal recoverer, the multiplexer, and the channel demodulator may be configured as separate modules or incorporated into a single module.

In a MIMO system, the transmitters 100a and 100b may operate in two modes, that is, Single CodeWord (SCW) mode and Multi-CodeWord (MCW) mode depending on how many coded packets are converted to a plurality of signal streams. One codeword is transmitted through a plurality of layers irrespective of the number of layers in the SCW mode, whereas one codeword is transmitted through each of a plurality of layers in the MCW mode. As a receiver determines for each codeword whether the codeword is successfully demodulated, using the Cyclic Redundancy Check (CRC) of the codeword in the MCW mode, the receiver may achieve an additional gain by a reception process such as interference cancellation. Therefore, each of the receivers 300a and 300b may further include an interference canceller for cancelling interference in addition to the demodulation, channel decoding and multiplexing modules, if it operates in the MCW mode.

The memories 200a and 200b may store programs required for signal processing and controlling of the processors 400a and 400b and temporarily store input and output information. The memory 200a of the UE 12 may store, for example, parameters received from the BS 12 for use in determining uplink power or later-described information about the priority levels of UL transmission channels. The memories 200a and 200b each may be implemented into a flash memory-type storage medium, a hard disc-type storage medium, a multimedia card micro-type storage medium, a card-type memory (e.g. a Secure Digital (SD) or eXtreme Digital (XS) memory), a Random Access Memory (RAM), a Read-Only Memory (ROM), an Electrically Erasable Programmable Read-Only Memory (EEPROM), a Programmable Read-Only Memory (PROM), a magnetic memory, a magnetic disc, or an optical disk.

Figure 4:
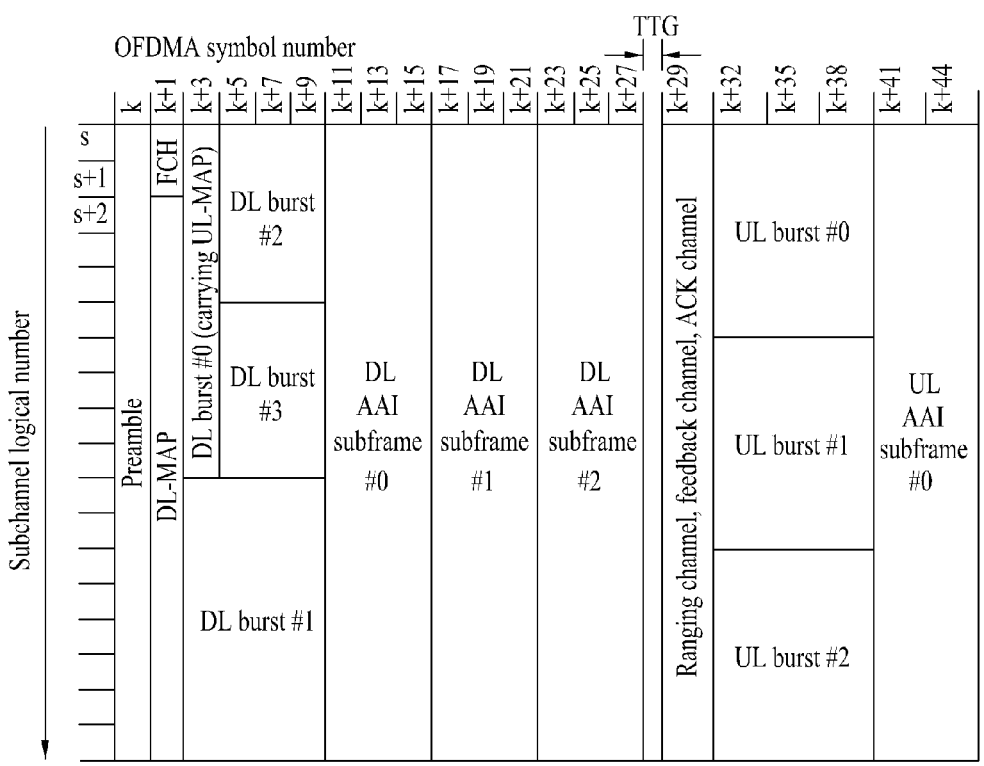
FIG. 4 illustrates an exemplary frame structure in the wireless communication system.

FIG. 4 illustrates an exemplary frame structure in the wireless communication system.

Among frame structures available to the wireless communication system, a Time Division Duplex (TDD) frame structure is illustrated in FIG. 4. In TDD, a UL signal and a DL signal are transmitted at different points of time, sharing the same frequency.

Referring to FIG. 4, the horizontal axis of a frame represents OFDMA symbols as time units and the vertical axis of the frame represents logical subchannel numbers as frequency units. The frame is divided into data sequence channels having predetermined time durations according to their physical characteristics. That is, one frame includes a DL subframe and a UL subframe. A receive/Transmit Transition Gap (RTG) is interposed between frames and a Transmit/receive Transition Gap (TTG) is interposed between a DL subframe and a UL subframe. The DL subframe may include a preamble, a Frame Control Header (FCH), a DL-MAP, a UL-MAP, and one or more DL data bursts. The UL subframe may include a ranging channel, a feedback channel, an ACKnowledgment (ACK) channel, and one or more UL data bursts.

The preamble is a predetermined sequence carried in the first symbol of each frame. The preamble is used for acquisition of initial synchronization between a BS and a UE, cell search, estimation of a frequency offset, and channel estimation. The FCH specifies the length and coding scheme of the DL-MAP message. The DL-MAP and the UL-MAP are Media Access Control (MAC) messages used to notify UEs of DL and UL channel resource assignments. The DL-MAP message defines access to DL channels, including a Downlink Channel Descriptor (DCD) that describes characteristics of DL physical channels. The UL-MAP message defines access to UL channels, including an Uplink Channel Descriptor (UCD) that describes characteristics of UL physical channels. The BS transmits a DCD periodically by a DCD message and a UCD periodically by a UCD message.

A data burst is a data unit carrying data from the BS to a UE or from a UE to the BS. One data burst may occupy one or more successive subframes. A subframe includes a plurality of symbols and its type is classified according to the number of symbols in the subframe. A type-1 subframe includes 6 symbols, a type-2 subframe includes 7 symbols, a type-3 subframes includes 5 symbols, and a type-4 subframe includes 9 symbols. A UL subframe delivers a UL control signal and UL data. For the UL transmission, a UL control channel and a UL data channel are allocated. As UL control channels, there are a Fast Feedback Channel (FBCH), a bandwidth reQuest channel (or a BW REQ channel), a Hybrid Automatic Repeat reQuest (HARQ) feedback channel, a sounding channel, and a ranging channel. There are two types of FBCHs, a UL Primary FBCH (PFBCH) and a UL Secondary FBCH (SFBCH). The PFBCH carries a broadband Channel Quality Indicator (CQI) and MIMO feedback information, whereas the SFBCH carries a narrow band CQI and MIMO feedback information. The bandwidth request channel is used for a UE to request radio resources for transmission of UL data or a UL control signal. The HARQ feedback channel carries a response to a DL data transmission, ACK/Negative ACK (ACK/NACK). The sounding channel is used for a BS to determine a UL channel response for the purpose of UL closed-loop MIMO transmission and UL scheduling. The ranging channel is used for UL synchronization. Ranging channels are further classified into a ranging channel for synchronized UEs and a ranging channel for non-synchronized UEs. The ranging channel for non-synchronized UEs is used for initial access and handover. The ranging channel for synchronized UEs is used for periodic ranging, also called a periodic ranging channel. A UE, which has already been synchronized to a target BS, performs tracking to be kept synchronized to the target BS by transmitting a periodic ranging signal.

The UE may transmit control information on the above-described control channels, such as an ACK/NACK, a CQI, a Precoding Matrix Index (PMI), a Bandwidth Request (BR), a scheduling request, and a sounding signal.

Figure 5:
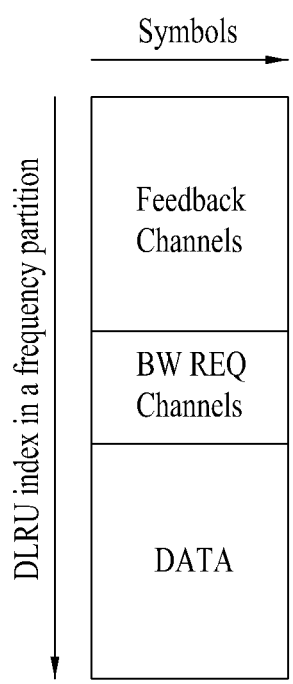
FIG. 5 illustrates an exemplary allocation of control channels and a data channel in a distributed Logical Resource Unit (LRU) of a frequency partition in an UpLink (UL) subframe.

FIG. 5 illustrates an exemplary allocation of control channels and a data channel in a distributed Logical Resource Unit (LRU) of a frequency partition in a UL subframe.

It is noted from FIG. 5 that feedback channels carrying UL feedback signals, bandwidth request channels carrying UL bandwidth request signals, and a data channel carrying UL data are distinguished from one another and UL control signals and UL data may be transmitted simultaneously in one symbol.

Figure 6:
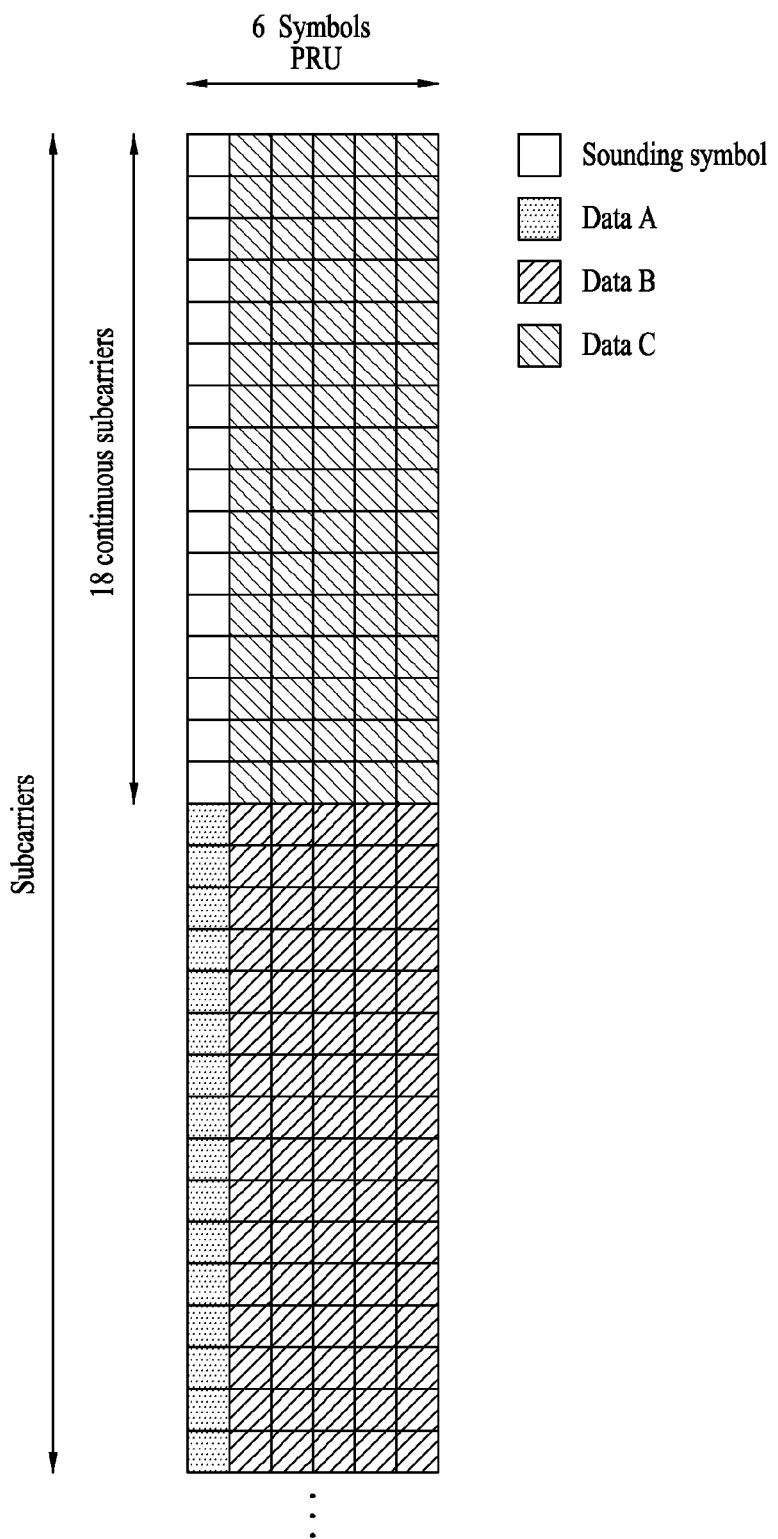
FIG. 6 illustrates an exemplary allocation of transmission channels in a Physical Resource Unit (PRU) in a UL subframe.

FIG. 6 illustrates an exemplary allocation of transmission channels in a Physical Resource Unit (PRU) in a UL subframe. The UL subframe is shown as a type-1 subframe with 6 symbols, by way of example.

In the case where Data A, B and C are allocated along with a sounding signal to a UL subframe, the sounding signal occupies one OFDMA symbol in the UL subframe. Irrespective of the type of the UL subframe, the sounding symbol is located in the first symbol of the UL subframe. Each UL subframe can contain only one sounding symbol. For the 6-symbol PRU, the remaining 5 symbols forms a 5-symbol PRU used for transmission of Data C.

As to transmission of Data A, the UE may modify a Type-1 subframe with six symbols to a Type-2 subframe with seven symbols in order to transmit Data A. Specifically, when a PRU without a sounding channel as well as a PRU with a sounding channel is allocated to the UE, the UE may modify the subframe type of the PRU without a sounding channel to a PRU with a sounding channel and transmit Data A in the modified PRU. In case of a Type-1 subframe with a pilot signal in the first symbol, however, if there is a shortage of transmit power for the first symbol, the channel estimation performance of a basic allocation unit is highly likely to be decreased. To solve this problem, the same symbol as the sounding symbol, which does not carry a sounding signal in a PRU, may be dedicated to pilot transmission or punctured, rather than the subframe type of the PRU is changed.

Now a description will be made of a method for calculating a required transmit power for a UL transmission channel.

For transmission of a UL control signal and UL data, required transmit power is allocated to a UL control channel and a UL data channel.

Uplink power control is supported for both initial calibration and periodic control of transmission power without loss of data. An uplink power control algorithm determines the transmission power of each symbol to compensate for path loss, shadowing, and fast fading. Also, uplink power control is intended to control an inter-cell interference level.

For power control, there are largely two schemes, Open Loop Power Control (OLPC) and Closed Loop Power Control (CLPC). CLPC is a power control scheme in which the transmission power of the UE 12 is increased or decreased according to a direct power increase/decrease message received from the BS 11. Compared to CLPC, OLPC is a power control scheme in which the UE 12 determines its transmission power on its own based on parameters received from the BS 11, instead of the direct power increase/decrease command from the BS 11. For example, the BS 11 transmits power control information to the UE 12 and the UE 12 then controls its uplink power based on the power control information.

The UE 12 may determine a transmit power per subcarrier and per stream by the following equation.

$$P \text{ (dBm)} = L + SINR_{Target} + NI + \text{Offset} \quad \text{[Equation 1]}$$

where L denotes an estimated average downlink propagation loss calculated at a given time by the UE, including a transmission antenna gain and path loss of the UE. The UE may calculate the downlink propagation loss L based on the total power of active subcarriers carrying a frame preamble. Additionally, the UE may calculate the downlink propagation loss L using another downlink reference signal. Besides, many other methods are available to calculate the downlink propagation loss L. $SINR_{Target}$ denotes a target SINR for the UE. Parameters required to determine the target SINR may be signaled to the UE by the BS or a predetermined value may be used as $SINR_{Target}$. In case of channel transmission except initial ranging and sounding transmission, the UE may determine target SINRs for transmission channels listed in Table 1 based on target SINRs set for the transmission channels as target SINR parameters in Table 1, received from the BS, while the UE may determine target SINRs for the other transmission channels by [Equation 2] using target SINR parameters received from the BS.

TABLE 1

| Control Channel Type | $SINR_{Target}$ Parameters |
|---|---|
| HARQ Feedback | SINR_Target_HARQ |
| Synchronized Ranging | SINR_Target_SyncRanging |
| PFBCH | SINR_Target_PFBCH |
| SFBCH | SINR_Target_SFBCH_Base |
|  | SINR_Target_SFBCH_Delta |
| Bandwidth Request | SINR_Target_BWRequest |

$$SINR_{Target} = \quad \text{[Equation 2]}$$
$$10\log 10\left(\max\left(10^{\wedge}\left(\frac{SINR_{MIN}(\text{dB})}{10}\right), \gamma_{IoT} \times SIR_{DL} - \alpha\right)\right) - \beta \times 10\log 10(TNS)$$

where $SINR_{MIN}$ (dB) denotes a SINR requirement for a minimum rate expected by the BS, that is, a minimum SINR required to improve the performance of a UE at a cell edge, and $\gamma_{IoT}$ is a fairness and Interference plus noise over Thermal noise (IoT) control factor. $SIR_{DL}$ is a linear ratio of a DL signal to interference power, measured by the UE. α is a factor based on the number of reception antennas of the BS, signaled by MAC power control signaling, and β is a stream factor indicating whether Total Number of Streams (TNS) is applied or not, determined and transmitted by the BS. TNS denotes the total number of streams in an LRU indicated by UL-MAP information. TNS may be unicast to the UE by the BS.

In [Equation 1], NI (dBm) denotes an estimated average power level of noise and interference per subcarrier, calculated based on an IoT (dB) received from the BS by [Equation 3].

$$NI = P_{TN} + IoT + 10\log 10(\Delta f) \quad \text{[Equation 3]}$$

where $P_{TN}$ denotes a thermal noise power density at 0° C., Δf denotes a subcarrier spacing, and IoT denotes a UL noise and interference level broadcast to UEs within the coverage area of the BS by the BS. All the UL noise and interference level are quantized in 0.5 dB steps as IoT level from 0 dB to 63.5 dB.

In [Equation 1], Offset denotes a UE-specific power offset that the BS has determined and transmitted to the UE.

For initial ranging, the UE transmits an initial ranging code on a random ranging channel. The initial transmit power of the ranging channel is determined based on a UE-measured Received Signal Strength Indication (RSSI). If the UE fails to receive a response to the initial ranging, it may increase the transmit power by a predetermined unit level and transmit a new initial ranging code at the increased power level.

Since power control is supported for the sounding channel to manage sounding quality, the UE's transmit power for the UL sounding channel is controlled separately according to its target SINR for the UL sounding channel. The power per subcarrier is maintained for the UL sounding channel as calculated by [Equation 1]. In [Equation 1], $SINR_{Target}$ is a target SINR for the sounding channel, which is set according to the DL Signal to Interference Ratio (SIR) of the UE defined by the parameter $SIR_{DL}$. In order to maintain the UL sounding quality, different target SINR values are allocated according to the DL SIR of each UE. For example, a UE with a high DL SIR applies a relatively high target SINR and a UE with a low DL SIR applies a relatively low target SINR.

The $SINR_{Target}$ for sounding channel can be calculated from [Equation 2] using the parameters in a message transmitted to the UE by the BS.

A method for allocating UL transmit power according to an embodiment of the present invention will be described below.

UEs have different maximum available transmit powers $P_{MAX}$ in different systems. A UE should determine a transmit power for each channel within its maximum available transmit power $P_{MAX}$. If the sum of the transmit powers of transmission channels that are to be transmitted simultaneously exceeds the maximum available transmit power $P_{MAX}$, the uplink transmission may be failed. Especially when different types of transmission channels are allocated to the UE for transmission during the same transmission interval and thus the UE should determine a transmit power for each transmission channel within the maximum available transmit power $P_{MAX}$, the effects of transmission failure of the transmission channels on the overall wireless communication system and transmit power-related error rates of the transmission channels vary with the types of the transmission channels. Accordingly, the transmission failure and error of a certain transmission channel may affect wireless communication more adversely in terms of quality and stability than transmission failures and errors of other transmission channels.

In this context, the present invention provides a method for prioritizing transmission channels according to their transmit powers, types, importance, and transmission schemes and allocating UL transmit power to the transmission channels according to their priority levels.

The UE calculates the transmit power of each antenna by a power control equation in such a manner that the sum of transmit powers of antennas does not exceed the maximum available transmit power $P_{MAX}$.

Power per stream and per transmission channel is calculated by [Equation 1] as follows. A precoder for a control channel and a precoder for a data channel are defined as [Equation 4] and [Equation 5], respectively, by way of example.

$$W_{Control\_j} = [w_{1,Ctrl\_j} \cdots w_{N_t,Ctrl\_j}] \quad \text{[Equation 4]}$$

where $N_t$ denotes the number of transmission antennas, $M_t$ denotes the number of streams, and $w_{i,Ctrl\_j}$ denotes an $i^{th}$ component of the control channel precoder $W_{Control\_i}$, which is multiplied by an $i^{th}$ antenna of a $j^{th}$ control channel.

$$W_{Data} = \begin{bmatrix} w_{1,1} & w_{1,1} & \cdots & w_{1,M_t} \\ w_{2,1} & w_{2,2} & \cdots & w_{2,M_t} \\ \cdots & \cdots & \cdots & \cdots \\ w_{N_t,1} & w_{N_t,2} & \cdots & w_{N_t,M_t} \end{bmatrix} \quad \text{[Equation 5]}$$

where $N_t$ denotes the number of transmission antennas, $M_t$ denotes the number of streams, and $w_{i,j}$ denotes an $(i, j)$ component of the data channel precoder $W_{Data}$, which is multiplied by an $i^{th}$ antenna of a $j^{th}$ stream.

The total power of an $n^{th}$ control channel in priority is determined by $$P_{total\_Control\_n} = \sum_{k=0}^{N_{sub\_ctrl}-1} \sum_{j=0}^{M_t-1} |w_{t,Ctrl\_j}^k|^2 P_{TX\_Control\_n} \quad \text{[Equation 6]}$$

where k is the index of a subcarrier in allocated resources, re-indexed to range from 0 to ($N_{sub\_ctrl}-1$). $N_{sub\_ctrl}$ is the total number of allocated subcarriers in a frequency.

$P_{TX\_Control\_n}$ denotes the power per subcarrier and per stream for the $n^{th}$ control channel, calculated by [Equation 1].

The power level per subcarrier of the sounding channel is maintained as a value calculated by [Equation 1]. Thus, the total power of the sounding channel may be expressed as $$P_{total\_Sounding} = \sum_{k=0}^{N_{sub\_snd}-1} P_{TX\_Sounding} \quad \text{[Equation 7]}$$

where $N_{sub\_snd}$ denotes the total number of subcarriers allocated for sounding.

The total power of an $i^{th}$ data channel in priority may be determined by $$P_{total\_Data\_i} = \sum_{k=0}^{N_{sub\_data}-1} \sum_{j=0}^{M_t-1} |w_{t,j}^k|^2 P_{TX\_Data\_i} \quad \text{[Equation 8]}$$

where k is the index of a subcarrier in the allocated resources, re-indexed to range from 0 to ($N_{sub\_ctrl}-1$). $N_{sub\_data}$ is the total number of allocated subcarriers. $P_{TX\_Data\_i}$ denotes the power per subcarrier and per stream of the $i^{th}$ data channel, calculated by [Equation 1].

The sum of UL transmit powers allocated to UL transmission channels according to their predetermined priority levels should be within the maximum available transmit power $P_{MAX}$ of the UE, which is expressed as $$P_{TX\_total} = \min(P_{MAX}, P_{total\_control\_1} + \cdots + P_{total\_sounding} + P_{total\_Data\_1} + \cdots) \quad \text{[Equation 9]}$$

The priority levels of transmission channels will be described in detail, taking an example.

In accordance with an embodiment of the present invention, transmission channels are prioritized in such a manner that priority levels are given to control channels except a bandwidth request channel and a sounding channel, the sounding channel, and a data channel in a descending order. An example of this prioritization will be described later with reference to Table 2 to Table 6. For the convenience's sake of description, the control channels except the bandwidth request channel and the sounding channel will be referred to simply as "control channels".

Table 2 to Table 7 illustrate exemplary prioritization of UL transmission channels, taking into account the types of control channels.

TABLE 2

| Channel Type |
| --- |
| HARQ feedback |
| PFBCH/SFBCH |
| Synchronized Ranging |
| Sounding |
| DATA |
| Bandwidth Request |

Referring to Table 2, the types of UL transmission channels are categorized into a data channel and control channels which are in turn classified according to their purposes. Typically, UL data has a retransmission opportunity by link adaptation or HARQ, for example, but there is no retransmission opportunity for a control signal because HARQ does not apply to the control signal. Therefore, it is necessary to give priority to a control channel over a data channel.

One thing to note herein is that a number of retransmission opportunities are available to the bandwidth request channel because a bandwidth request can be transmitted in various manners. If a UE fails to receive an ACK for its transmitted bandwidth request from a BS, the UE may retransmit the bandwidth request to the BS, for example, by random access, a bandwidth request signaling header, a piggybacked bandwidth request, or an FBCH. The random access bandwidth request may be transmitted on the bandwidth request channel in the absence of a feedback signal and a data signal to be transmitted. The bandwidth request signaling header may be transmitted as a response to an ACK for a bandwidth request header, received from the BS. In the presence of data at the moment of transmitting a bandwidth request, the data is piggybacked with the bandwidth request. If there is a fast feedback signal to be transmitted at the time of transmitting a bandwidth request, the bandwidth request may be transmitted to the BS on a PFBCH. Although the bandwidth request channel is basically a kind of control channel, it is given a lowest priority in Table 2 to Table 5 because a number of retransmission methods and opportunities are available to the bandwidth request channel.

Referring to Table 2, the HARQ feedback channel carrying an ACK/NACK signal as a response to a DL data transmission is a necessity for HARQ that is intended to increase the transmission efficiency of packet data by reducing the number of retransmission requests from the UE to the BS, a highest priority is given to the HARQ channel.

The PFBCH/SFBCH carries a CQI, a Space Time Coding (STC) rate indicator, a PMI, etc. Since the PFBCH/SFBCH is involved in DL scheduling, DL user selection, and resource allocation, the PFBCH/SFBCH is placed behind the HARQ feedback channel in priority.

In case of failed UL synchronization, the BS cannot identify a UE, which makes normal resource allocation and subsequent communication impossible. Once a UE is synchronized to a particular BS, the UE needs to be kept synchronized through tracking by transmitting a periodic ranging signal to the BS. Thus, the ranging channel used to maintain synchronization between the UE and the BS has a high priority level.

After the UL synchronization is acquired, the UE transmits a sounding signal to the BS. The BS then estimates a UL channel quality using the sounding signal and accordingly performs user selection and resource allocation. Considering the UE should be kept synchronized to a target BS to stably transmit a sounding signal to the target BS, the sounding channel carrying the sounding signal is given a lower priority level than the synchronized ranging channel.

As described before, despite a transmission failure, data has a retransmission opportunity. Therefore, the data channel is lower in priority than any of the HARQ feedback channel, the PFBCH/SFBCH, the synchronized ranging channel, and the sounding channel.

TABLE 3

| Channel Type |
| --- |
| HARQ feedback |
| Synchronized Ranging |
| PFBCH/SFBCH |
| Sounding |
| DATA |
| Bandwidth Request |

Referring to Table 3, the same priority levels as shown in Table 2 are given to the HARQ feedback channel, the sounding channel, the data channel, and the bandwidth request channel. The UL transmission channels according to Table 3 are prioritized based on their update periods as well as their importance and retransmission opportunities. This prioritization is applicable when the PFBCH/SFBCH is updated in a short period. In this case, despite a transmission failure of the PFBCH/SFBCH, the next immediate update of the PFBCH/SFBCH brings the effect of retransmission of fast feedback information. That's why the synchronized ranging channel has priority over the PFBCH/SFBCH.

TABLE 4

| Channel Type |
| --- |
| PFBCH/SFBCH |
| Synchronized Ranging |
| HARQ feedback |
| Sounding |
| DATA |
| Bandwidth Request |

Referring to Table 4, although HARQ feedback is significant, the BS may retransmit DL data by NACK processing when the UE has failed to transmit an ACK/NACK signal for the DL data. Therefore, the HARQ feedback channel has a low priority level in Table 4.

TABLE 5

| Channel Type |
| --- |
| PFBCH/SFBCH |
| Synchronized Ranging |
| Sounding |
| HARQ feedback |
| DATA |
| Bandwidth Request |

Referring to Table 5, a sounding signal is used for the BS to determine a UL channel response. An inaccurate sounding signal may adversely affect UL closed-loop MIMO transmission and UL scheduling. Considering the importance of accurate sounding signal transmission, the BS gives priority to the sounding channel over the HARQ feedback channel that has been given a low priority level because the BS may retransmit a previously transmitted DL packet even though it does not receive an HARQ feedback for the DL packet. However, since the sounding signal should be transmitted synchronized, the priority level of the sounding channel is set to be lower than that of the synchronized ranging channel.

TABLE 6

| Channel Type |
| --- |
| PFBCH/SFBCH |
| HARQ feedback |
| Synchronized Ranging |
| Sounding |
| DATA |
| Bandwidth Request |

Referring to Table 6, transmission failure of an HARQ feedback causes data retransmission. An increase in the number of retransmissions means that resources should be continuously allocated for the data. As a consequence, reduced resources may be allocated to new packets for new users, which may result in degraded performance of the overall wireless communication system. In Table 6, the HARQ feedback channel is set to be lower in priority than the PFBCH/SFBCH, taking into account the probability of data retransmission, but to be higher in priority than the synchronized ranging channel, due to problems that may be caused by successive failures of HARQ feedback transmission.

While it has been described with reference to Table 2 to Table 6 that the lowest priority is given to the bandwidth request channel, it may be further contemplated that when a bandwidth request is urgent, the bandwidth request channel is given priority over any of the HARQ feedback channel, the PFBCH/SFBCH, the synchronized ranging channel, the sounding channel, and the data channel.

Depending on the system implementation of UEs and BSs or the overall wireless communication environment and status, a relatively high priority level may be given to data. Table 7 illustrates an example of prioritizing data over uplink-related information in a system.

TABLE 7

Channel Type

PFBCH/SFBCH
DATA
HARQ feedback
Synchronized Ranging
Sounding
Bandwidth Request

In the above examples of prioritization, data may be further prioritized according to MCS levels, whether data is an initial transmission packet or a retransmission packet, whether data has a periodic traffic pattern and a fixed payload size and persistent allocation applies to the data in order to reduce an allocation overhead for a connection, or whether group allocation applies to data, that is, the data is for Voice over IP (VoIP), for example. Alternatively, equal power may be allocated to data without prioritizing the data. If data channels are prioritized, a MAC control message carrying control information in the MAC layer responsible for mapping between logical channels and transport channels may have a higher priority than user data.

The above-described priority levels of transmission channels may be used as a fixed criterion for every UE, for uplink power allocation. Or when there is a shortage of available power for a transmission channel during a specific interval in a UE, BS-specific or UE-specific priority levels, which are shared between the UE and the BS, may be used as a criterion of allocating power to the UE's uplink transmission channels. In the latter case, information about the BS-specific or UE-specific priority levels may be pre-stored in the BS and the UE, or the BS or the UE may transmit the priority level information to the BS or the UE when there is a shortage of the UE's available power.

Obviously, it is not necessary to allocate all transmission channels which have been prioritized in the above manners to the same interval. Only one of a control channel, a sounding channel, and a data channel, or both of the control channel, the sounding channel, and the data channel may be allocated. Transmit power needs to be determined only for channels allocated to the same interval according to their priority levels. For example, if only a control channel is allocated, only the priority level of the control channel is considered. If both a control channel and a data channel are allocated, transmit power is sequentially allocated to them in a descending order of priority levels.

It may occur in some cases that allocation of uplink transmit power according to the priority levels of transmission channels adversely affects system stability. Referring to Table 5, for example, when a PFBCH/SFBCH signal, a synchronized ranging signal, a sounding signal, and an HARQ feedback signal are to be transmitted at the same time, uplink transmit power is allocated sequentially to the PFBCH/SFBCH, the synchronized ranging channel, the sounding channel, and the HAR feedback channel in this order, within a maximum available transmit power $P_{MAX}$. If none of the maximum available power $P_{MAX}$ remains for the first symbol after power allocation to the sounding channel in the first symbol, no power is allocated to the HARQ feedback channel in the first symbol. For the second and subsequent symbols, transmit power is allocated to the PFBCH/SFBCH and the synchronized ranging channel.

Referring to FIG. 6, since the sounding signal resides only in the first symbol, there is no need for allocating transmit power to the sounding channel in the second and subsequent symbols. Hence, in case of Table 3, transmit power is allocated to the HARQ feedback channel after power allocation to the synchronized ranging channel. The transmit power of each transmission channel should be maintained uniform within a symbol. If transmit power is allocated to the HARQ feedback channel, starting from the second symbol, without power allocation to the HARQ feedback channel in the first symbol, the transmit power of the HARQ feedback channel is not uniform across the same basic allocation unit. As to a control channel, if even one symbol is excluded from power allocation and thus punctured in a basic allocation unit, the resulting change of reception characteristics of the control channel may degrade the reception performance of the BS. To avert this problem, when a sounding signal is allocated and the sounding channel has priority over the control channel, uplink transmit power is allocated to the first symbol carrying the sounding symbol according to predetermined priority levels of transmission channels and transmit power is allocated to the second symbol according to the predetermined priority levels of the transmission channels except the control channel. That is, when a control signal and a data signal are to be transmitted at the same time in a UL subframe, transmit power may be allocated to a data channel with priority, starting from the second symbol of the UL subframe.

Figure 7:
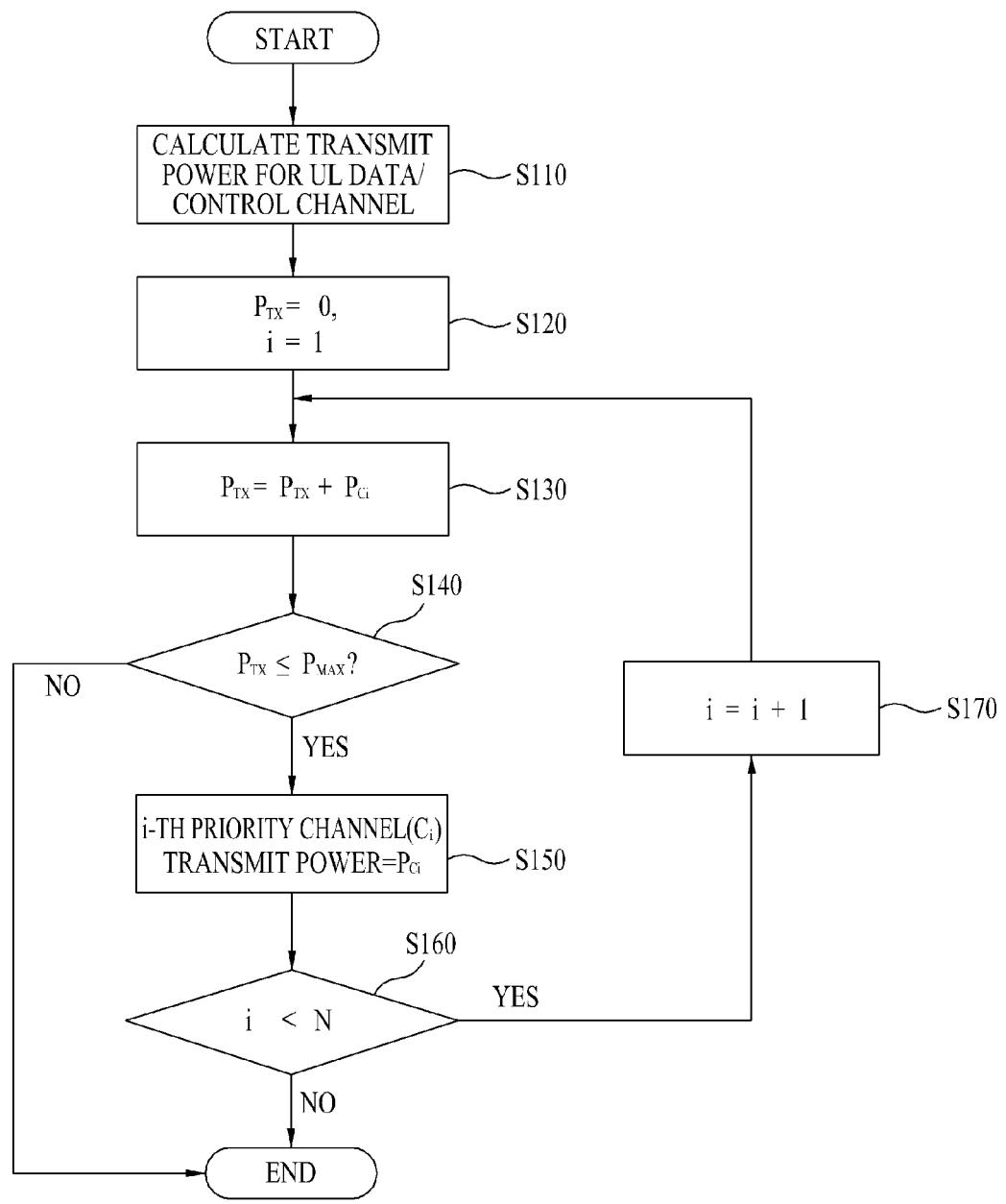
FIG. 7 is a flowchart illustrating a method for allocating UL transmit power according to an embodiment of the present invention.

FIG. 7 is a flowchart illustrating a method for allocating UL transmit power according to an embodiment of the present invention. The terms used herein are defined as follows.

$P_{TX}$ is the estimated sum of UL transmit powers, $C_i$ is a transmission channel with an $i^{th}$ priority level according to a predetermined prioritization, $P_{Ci}$ is a transmit power required to transmit the transmission channel $C_i$, $P_{MAX}$ is a maximum available transmit power for a UE, and N is the total number of transmission channels to be transmitted simultaneously.

Referring to FIG. 7, a UL transmit power is calculated for each of a plurality of transmission channels that are to be transmitted during the same transmission interval in step S110. For example, the UE may calculate each of UL transmit powers $P_{Ci}$ to $P_{CN}$ of transmission channels $C_i$ to $C_N$ to be transmitted at the same time, by [Equation 1].

In step S120, $P_{TX}$ is set to '0' before transmit power is allocated to the transmission channels.

The transmit power $P_{C1}$ of a transmission channel $C_1$ with the highest priority level among the predetermined priority levels of the transmission channels is added to the estimated sum of transmit power, $P_{TX}$ and if $P_{TX}$ (=$P_{C1}$) is less than $P_{MAX}$, $P_{C1}$ is allocated to the transmission channel $C_1$ in steps S130, S140 and S150.

A transmit power $P_{c2}$ of a transmission channel $C_2$ with the second highest priority level is added to the estimated sum of transmit power, $P_{TX}$ and if $P_{TX}$ ($=P_{C1}+P_{C2}$) is still less than $P_{MAX}$, $P_{C2}$ is allocated to the transmission channel $C_2$ in steps S130, S140 and S150.

If there is another channel to be transmitted in step S160, the above operation is repeated for the next channel in step S170.

If transmit power can be allocated to all of N transmission channels within the maximum available transmit power $P_{MAX}$, allocation of appropriate UL transmit power to all transmission channels is completed. However, if the sum of the transmit powers of the first transmission channel to a certain one of the N transmission channels, for example, a transmission channel $C_k$ with a $k^{th}$ priority level is less than the maximum available transmit power $P_{MAX}$ but addition of the transmit power $P_{Ck+1}$ of a transmission channel $C_{k+1}$ to the sum $P_{TX}$ is larger than $P_{MAX}$, the transmit power $P_{Ck+1}$ cannot be allocated to the transmission channel $C_{k+1}$.

The UE transmits signals on up to the first-priority to $k^{th}$-priority channel C1 to $C_k$ that satisfy the condition of [Equation 10].

$$\sum_{i=1}^{k} P_{Ci} \le P_{MAX} \quad \text{[Equation 10]}$$

To describe FIG. 7 with reference to Table 2, if only control signals are transmitted without a sounding signal and data, UL transmit power is allocated to the control signals within the maximum available transmit power $P_{MAX}$ in the order of the HARQ feedback channel, the PFBCH/SFBCH, the synchronized ranging channel, and the bandwidth request channel. If the sum of the transmit powers of the HARQ feedback channel, the PFBCH/SFBCH, the synchronized ranging channel is less than the maximum available transmit power $P_{MAX}$ but with addition of the bandwidth request channel, the sum of UL transmit power exceeds the maximum available transmit power $P_{MAX}$, the UL transmit powers calculated by [Equation 1] are allocated only to the HARQ feedback channel, the PFBCH/SFBCH, and the synchronized ranging channel, with no power allocated to the bandwidth request channel with the lowest priority.

Regarding the timing when the transmit powers of transmission channels are calculated, the calculation timing of the transmit powers is implementation-dependent. Although it is described above that the UE calculates each of UL transmit powers $P_{Ci}$ to $P_{CN}$ of transmission channels $C_i$ to $C_N$ to be transmitted at the same time in step S110, for example, the UE may calculate the UL transmission powers of transmission channels $C_i$ to $C_x$ one-by-one based on the predetermined priority order of the transmission channels until the total transmission power $P_{TX}$ of $C_i$ to $C_x$ reaches the $P_{MAX}$. In other words, based on the predetermined priority order of transmission channels, a UL transmit power $P_{C1}$ for a transmission channel C1 is calculated and allocated to C1, unless $P_{TX}$ to which $P_{C1}$ is added reaches the $P_{MAX}$. And, a UL transmit power $P_{C2}$ for a transmission channel $C_2$ is calculated and allocated to $C_2$, unless $P_{TX}$ to which the $P_{C2}$ is added reaches the $P_{MAX}$. These processes are repeated until $P_{TX}$ reaches the $P_{MAX}$.

The embodiment of FIG. 7 will be described below in more detail referring to FIG. 2.

In the UE 12, the processor 400a calculates a necessary UL transmit power for each of a plurality of transmission channels to be transmitted during the same interval in step S110. For example, the processor 400a may calculate UL transmit powers $P_{Ci}$ to $P_{CN}$ for transmission channels $C_1$ to $C_N$ to be transmitted at the same time according to [Equation 1]. For calculation of [Equation 1], the receiver 300a receives an IoT value by which to calculate NI and target SINR parameters broadcast from the BS 11 and an Offset value unicast from the BS 11. The receiver 300a provides the IoT value, the target SINR parameters, and the Offset value to the processor 400a. The processor 400a calculates NI using the IoT value and determines a target SINR for each channel using the target SINR parameters according to the type of the channel.

The processor 400a allocates a UL transmit power to the highest-priority transmission channel above all others according predetermined priority levels. To do so, the processor 400a may be adapted to perform the algorithm of increasing $P_{TX}$ each time a UL transmit power is allocated to a transmission channel (S130), the algorithm of comparing $P_{TX}$ with $P_{MAX}$ (S140), and the algorithm of increasing the index of a transmission channel by 1 each time, according to the priority levels of transmission channels (S170).

The processor 400a sets the estimated sum of transmit powers $P_{TX}$ to '0' before allocating transmit powers to transmission channels in step S120 and increases $P_{TX}$ by adding the transmit power of a transmission channel to $P_{TX}$ according to the priority levels of the transmission channels in step S130. In steps S140 and S150, the processor 400a allocates transmit powers calculated by [Equation 1] only to up to transmission channels whose power sum $P_{TX}$ does not exceed the maximum available transmit power $P_{MAX}$. For example, if with addition of the transmit power of a transmission channel $C_{k+1}$ with a $(k+1)^{th}$ priority level UL transmit power to $P_{TX}$, $P_{TX}$ is larger than $P_{MAX}$, transmit power is allocated only to the first-priority to $k^{th}$-priority transmission channels $C_1$ to $C_k$ according to [Equation 1].

The processor 400a controls the transmitter 100a and the antenna 500a to transmit the transmission channels $C_1$ to $C_k$ that satisfy [Equation 10] with the transmit power $P_{C1}$ to $P_{Ck}$.

As mentioned before, the calculation timing of the transmit powers is implementation-dependent. For example, the processor 400a may be configured to calculate the UL transmission powers of transmission channels $C_i$ to $C_x$ one-by-one based on the predetermined priority order of the transmission channels until the total transmission power $P_{TX}$ of $C_i$ to $C_x$ reaches the $P_{MAX}$. In other words, based on the predetermined priority order of transmission channels, the processor 400a may be configured to calculate a UL transmit power $P_{C1}$ for a transmission channel C1 and configured to allocate the calculated $P_{C1}$ to C1, unless $P_{TX}$ to which $P_{C1}$ is added reaches the $P_{MAX}$. And, the processor 400a calculates a UL transmit power $P_{C2}$ for a transmission channel $C_2$ and allocates the calculated $P_{C2}$ to $C_2$, unless $P_{TX}$ to which the $P_{C2}$ is added reaches the $P_{MAX}$. The processor 400a repeats these processes until $P_{TX}$ reaches the $P_{MAX}$.

The UE 12 may notify the BS 11 that the remaining transmission channels $C_{k+1}$ to $C_N$ are not transmitted by additional information.

The difference between the maximum available transmit power $P_{MAX}$ and the sum of the transmit powers of the transmission channels $C_1$ to $C_k$ may be expressed as $$P_{remain} = P_{MAX} - \sum_{i=1}^{k} P_{Ci} \quad \text{[Equation 11]}$$

The UE 12 thus has a remaining available power $P_{remain}$ and how to utilize the remaining available power $P_{remain}$ is a consideration.

Figure 8:
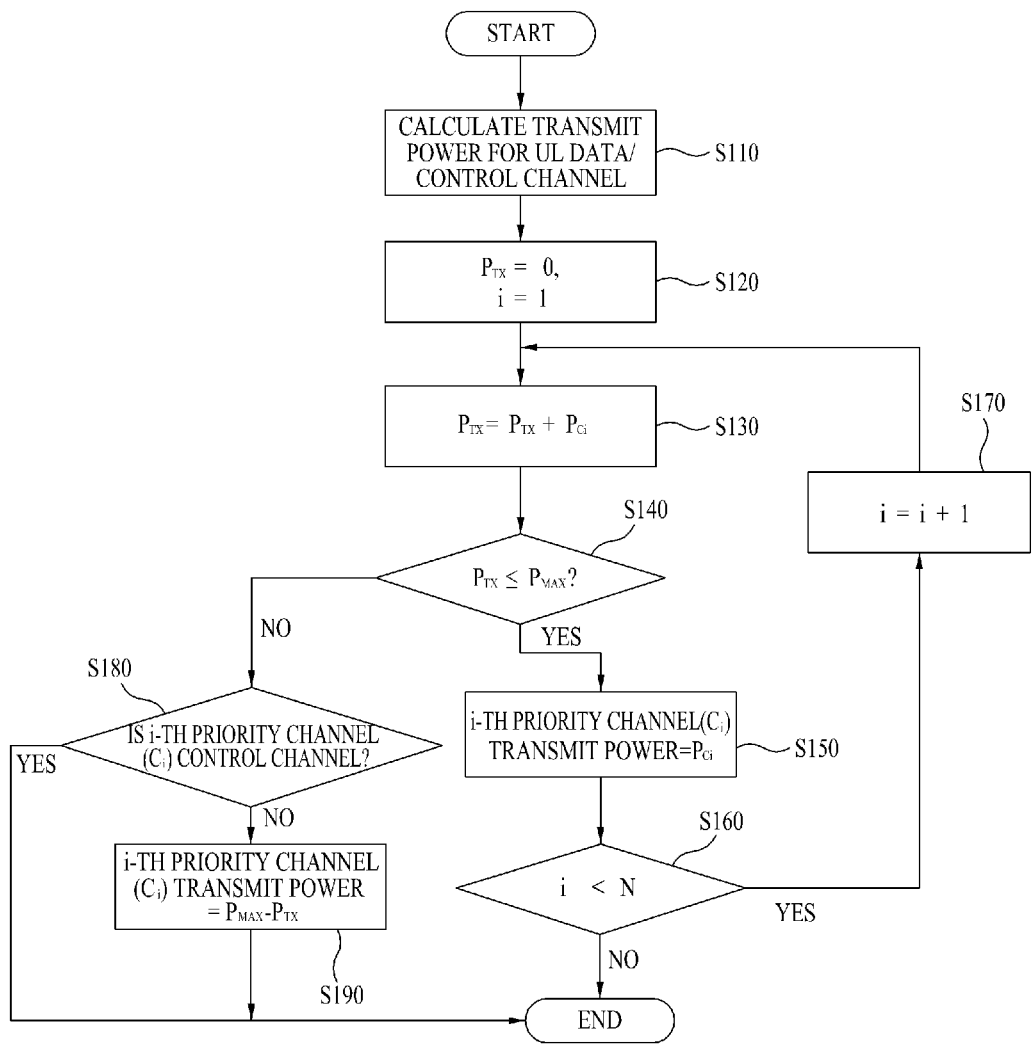
FIG. 8 is a flowchart illustrating a method for allocating UL transmit power according to another embodiment of the present invention.

FIG. 8 is a flowchart illustrating a method for allocating UL transmit power according to another embodiment of the present invention.

The variables $P_{TX}$, $C_i$, $P_{Ci}$, $P_{MAX}$ and N have been defined with reference to FIG. 7. In the same manner as illustrated in FIG. 7 or described in FIG. 7, transmit power is sequentially allocated to transmission channels in a descending order of priority in steps S110 to S170.

Compared to the embodiment illustrated or described in FIG. 7, it is determined whether to allocate the remaining power $P_{remain}$ according to the type of the first transmission channel $C_{k+1}$ whose addition makes $P_{TX}$ exceed $P_{MAX}$ in step S180 in the embodiment illustrated in FIG. 8. Although as much transmit power as $P_{k+1}$ is required for transmission of the transmission channel $C_{k+1}$, the remaining available power of the UE, $P_{remain}$ is less than $P_{k+1}$. If the transmission channel $C_{k+1}$ is transmitted with less power than $P_{k+1}$, the BS may not receive the transmission channel $C_{k+1}$ at all, or if ever, the BS may not identify the transmission channel $C_{k+1}$. Wrong control information on a control channel affects the next communication process. Therefore, it is necessary to guarantee stable channel transmission for a control channel, compared to a data channel.

In this context, if the transmission channel $C_{k+1}$ is a control channel, its transmission is dropped, rather than the transmission channel $C_{k+1}$ is transmitted with the remaining available power $P_{remain}$. On the other hand, if the transmission channel $C_{k+1}$ is a data channel, the transmission channel $C_{k+1}$ is transmitted with the remaining available power $P_{remain}$ in step S190. That is, if there is a shortage of transmit power for a specific control channel, transmission of the control channel is dropped.

As to the sounding channel, an inaccurate sounding signal may affect the UE adversely. Hence, if the transmission channel $C_{k+1}$ is a sounding channel, its transmission is dropped.

The UE may transmit information about transmission channels that cannot be transmitted to the BS so that the BS can identify the status of the UE based on the received information.

To describe FIG. 8 with reference to Table 2, if only control signals are transmitted without a sounding signal and data, uplink transmit power is allocated to the control signals within the maximum available transmit power $P_{MAX}$ in the order of the HARQ feedback channel, the PFBCH/SFBCH, the synchronized ranging channel, and the bandwidth request channel. If the sum of the transmit powers of the HARQ feedback channel and the PFBCH/SFBCH is less than $P_{MAX}$ but the sum of the transmit powers of the HARQ feedback channel, the PFBCH/SFBCH, and the synchronized ranging channel is larger than $P_{MAX}$, UL transmit powers calculated by [Equation 1] are allocated to only the HARQ feedback channel and the PFBCH/SFBCH, while transmission of the synchronized ranging channel is dropped.

The embodiment of FIG. 8 will be described below in more detail referring to FIG. 2.

Compared to the embodiment of FIG. 7, in the UE 12, the processor 400a may determine whether to allocate the remaining power $P_{remain}$ to the first transmission channel $C_{k+1}$ whose addition leads to $P_{TX}$ larger than $P_{MAX}$ according to the type of the transmission channel $C_{k+1}$ in step S180.

If the transmission channel $C_{k+1}$ is a control channel or a sounding channel, the transmission of the transmission channel $C_{k+1}$ is dropped, rather than the transmission channel $C_{k+1}$ is transmitted with the remaining power $P_{remain}$. That is, the processor 400a controls the transmitter 100a and the antenna 500a to transmit only the transmission channels $C_1$ to $C_k$ that satisfy [Equation 10] with the transmit power $P_{C1}$ to $P_{Ck}$.

On the other hand, if the transmission channel $C_{k+1}$ is a data channel, the remaining power $P_{remain}$ is allocated to the transmission channel $C_{k+1}$ in step S190. Then the processor 400a controls the transmitter 100a and the antenna 500a to transmit the transmission channel $C_{k+1}$ with the transmit power $P_{remain}$. That is, the processor 400a allocates the remaining power $P_{remain}$ to the transmission channel $C_{k+1}$ and controls the transmitter 100a and the antenna 500a to transmit the transmission channel $C_{k+1}$ along with transmission channels $C_1$ to $C_k$ that satisfy [Equation 10].

FIG. 9 is a flowchart illustrating a method for allocating UL transmit power according to another embodiment of the present invention.

The variables $P_{TX}$, $C_i$, $P_{Ci}$, $P_{MAX}$ and N have been defined with reference to FIG. 7. $P_{TX}$ may be set to '0' initially in step S210.

Referring to FIG. 9, in case of simultaneous transmission of a plurality of transmission channels, UL transmission power of assigned channels is determined based on the predetermined priority order of the transmission channels until the total transmission power reaches maximum power limitation $P_{MAX}$ of the UE in steps S210 to S280. UL transmission power of an assigned channel can be calculated according to [Equation 1]. The parameters necessary for calculating the transmission power can be broadcast or unicast from a BS to the UE.

Compared to FIGS. 7 and 8, a UL transmit power $P_{Ci}$ for one transmission channel $C_i$ is calculated in step S220, and $P_{TX}$ to which the $P_{Ci}$ is added in step S230 is compared with $P_{MAX}$ in step S240. In other words, the UE calculates the UL transmission powers one-by-one until the total transmission power reaches the $P_{MAX}$. As mentioned in the description of FIG. 7, the timing when the UL transmit power is calculated is implementation dependent problem, so the UL transmission powers for assigned channels may be calculated at the same time.

If $P_{TX}$ does not exceed $P_{MAX}$, the calculated $P_{Ci}$ is allocated to $C_i$ in step S250. If there is another channel to be transmitted in step S260, the above operations in S220 to S250 are repeated for the next channel in step S270.

Compared to the embodiments illustrated in FIG. 8, the remaining power $P_{remain}$ is allocated to the $C_{k+1}$ in step S280 regardless of the type of transmission channel $C_{k+1}$ whose addition to $P_{TX}$ makes the $P_{TX}$ exceed $P_{MAX}$. Although as much transmit power as $P_{k+1}$ is required for transmission of the transmission channel $C_{k+1}$, the remaining available power of the UE, $P_{remain}$ is less than $P_{k+1}$. Unlike the embodiment illustrated in FIG. 8, the UE according to the embodiment illustrated in FIG. 9 allocates $P_{remain}$ to $C_{k+1}$ in step S280, and transmit simultaneously C1 to $C_{k+1}$ with their allocated UL transmission powers. It is advantageous in that the $P_{MAX}$ of the UE is used up for transmitting the assigned channels, thereby the $P_{remain}$ is not wasted.

In this context, if there is the transmission channel $C_{k+2}$, the transmission of transmission channel(s) from $C_{k+2}$ is dropped.

The embodiment of FIG. 9 will be described below in more detail referring to FIG. 2.

In the UE 12, the processor 400a is configured to set the initial value of $P_{TX}$ to '0' in step S210.

Referring to FIG. 9, in case of simultaneous transmission of a plurality of transmission channels, the processor 400a is configured to determine UL transmission power of assigned channels based on the predetermined priority order of the transmission channels until the total transmission power reaches maximum power limitation $P_{MAX}$ of the UE in steps S210 to S280. The processor 400a can be configured to calculate UL transmit power $P_{Ci}$ for transmission channel $C_i$ according to [Equation 1]. For calculation of [Equation 1], the receiver 300a receives an IoT value by which to calculate NI, target SINR parameters broadcast from the BS 11 and an Offset value unicast from the BS 11. The receiver 300a provides the IoT value, the target SINR parameters, and the Offset value to the processor 400a. The processor 400a calculates NI using the IoT value and determines a target SINR for each channel using the target SINR parameters according to the type of the channel.

Compared to FIGS. 7 and 8, the processor 400a is configured to calculate a UL transmit power $P_{Ci}$ for a transmission channel $C_i$ in step S220, and compare $P_{TX}$ to which the $P_{Ci}$ is added in step S230, with $P_{MAX}$ in step S240. In other words, the processor 400a is configured to calculate the UL transmission powers one-by-one until the total transmission power reaches the $P_{MAX}$. As mentioned in the description of FIG. 7, the timing when the UL transmit power is calculated is implementation dependent problem, so the processor 400a may calculate the UL transmission powers for assigned channels at the same time.

If $P_{TX}$ does not exceed $P_{MAX}$, the processor 400a allocates the calculated $P_{Ci}$ to $C_i$ in step S250. If there is another channel to be transmitted in step S260, the processor 400a repeats the above operations in S220 to S250 for the next channel in step S270.

Compared to the embodiments illustrated in FIG. 8, the processor 400a allocates the remaining power $P_{remain}$ to the $C_{k+1}$ in step S280 regardless of the type of transmission channel $C_{k+1}$ whose addition to $P_{TX}$ makes the $P_{TX}$ exceed $P_{MAX}$. Although as much transmit power as $P_{k+1}$ is required for transmission of the transmission channel $C_{k+1}$, the remaining available power of the UE, $P_{remain}$ is less than $P_{k+1}$. Unlike the embodiment illustrated in FIG. 8, the processor 400a according to the embodiment illustrated in FIG. 9 allocates $P_{remain}$ to $C_{k+1}$ in step S280, and controls the transmitter 100a to transmit simultaneously C1 to $C_{k+1}$ with their allocated UL transmission powers. If there is the transmission channel $C_{k+2}$, the processor 400a controls the transmitter 100a to drop the transmission of transmission channel(s) from $C_{k+2}$.

Transmission of transmission channels on a single carrier has been described above. Now a method for allocating UL transmit power to transmission channels when they are transmitted on a plurality of carriers will be described below.

If power is not limited for each carrier, power may be allocated to transmission channels allocated to the plurality of carriers in the above-described manner. That is, without distinguishing the carriers, a transmit power is determined for each of the transmission channels and the transmit powers are allocated to the transmission channels within a maximum available power of a UE, $P_{MAX}$ according to predetermined priority levels of the transmission channels.

However, if there is a limit on power for each carrier, power is allocated to transmission channels allocated to each carrier within the power limit of the carrier according to the priority levels of the transmission channels. If the total power of the carriers exceeds the maximum available transmit power $P_{MAX}$, transmission channels may be dropped in an ascending order of priority until maximum available transmit power $P_{MAX}$ is not exceeded. It is also possible to allocate power to transmission channels according to predetermined priority levels of the transmission channels within maximum available transmit power, without distinguishing the carriers and then determine whether the power allocated to each carrier exceeds the power limit of the carrier. For example, if the total power of a specific carrier exceeds a power limit of the carrier, transmission channels allocated to the carrier may be dropped in an ascending order of priority. If there are a plurality of carriers whose total power exceeds their power limits, transmission channels allocated to the carriers are dropped in an ascending order of priority until the maximum available transmit power $P_{MAX}$ is not exceeded for the carriers.

The UL power allocation of the plurality of carriers may be controlled by the controller 400a of the UE 12. The processor 400a controls the transmitter 100a to simultaneously transmit transmission channels at transmit powers which have been allocated to them within the maximum available transmit power $P_{MAX}$.

In accordance with the above-described embodiments of the present invention, UL transmit power can be allocated efficiently within a maximum available power $P_{MAX}$ of a UE.

Transmission channels are prioritized according to their significance, update periods, and retransmission chance. Therefore, a UL control signal and data can be transmitted stably, thus contributing to the stability of the overall wireless communication system.

INDUSTRIAL APPLICABILITY

The present invention is applicable to a method and apparatus for controlling UL power in a wireless communication system.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for controlling uplink transmit power at a user equipment in a wireless communication system, the method comprising:

allocating uplink transmit power $P_{C1}$ to $P_{Ck}$ for one or more transmission channels $C_1$ to $C_k$ such that a total uplink transmit power allocated to the one or more transmission channels $C_1$ to $C_k$ does not exceed a predetermined maximum transmit power of the user equipment, where k is a number of the one or more transmission channels and $P_{Ci}$ is the uplink transmit power of the transmission channel $C_i$; and performing uplink transmission through the one or more transmission channels $C_1$ to $C_k$ at the uplink transmit power $P_{C1}$ to $P_{Ck}$, wherein the uplink transmit power $P_{C1}$ to $P_{Ck}$ for the one or more transmission channels $C_1$ to $C_k$ is allocated based on a predetermined priority order that includes, from highest priority to lowest priority, a hybrid automatic repeat request (HARQ) feedback channel, a fast feedback channel (FBCH), a ranging channel, a sounding channel, a data channel, and a bandwidth request channel.

2. The method according to claim 1, further comprising:

allocating a remaining uplink transmit power to another transmission channel of which priority order is lower than the one or more transmission channels $C_1$ to $C_k$, to even when the remaining uplink transmit power corresponding to a difference in power between the predetermined maximum transmit power and the total uplink transmit power is less than a predetermined sufficient uplink transmit power of the another transmission channel; and performing uplink transmission through the another transmission channel at the remaining uplink transmit power simultaneously with the uplink transmission through the one or more transmission channels $C_1$ to $C_k$.

3. The method according to claim 1, further comprising:

allocating a remaining uplink transmit power to another transmission channel of which priority order is lower than the one or more transmission channels $C_1$ to $C_k$ when the another transmission channel is the data channel, even when the remaining uplink transmit power corresponding to a difference in power between the predetermined maximum transmit power and the total uplink transmit power is less than a predetermined sufficient uplink transmit power of the another transmission channel, and performing uplink transmission through the another transmission channel at the remaining uplink transmit power simultaneously with the uplink transmission through the one or more transmission channels $C_1$ to $C_k$; and performing the uplink transmission through the one or more transmission channels $C_1$ to $C_k$ only, wherein when the another transmission channel is the HARQ feedback channel, the FBCH, the ranging channel or the bandwidth request channel, and when the remaining uplink transmit power is less than the predetermined sufficient uplink transmit power of the another transmission channel.

4. A user equipment for controlling uplink transmit power in a wireless communication system, the user equipment comprising:

a transmitter configured to transmit signals; and
a processor configured to control the transmitter,
wherein the processor is configured to allocate uplink transmit power $P_{C1}$ to $P_{Ck}$ for one or more transmission channels $C_1$ to $C_k$ such that a total uplink transmit power allocated to the one or more transmission channels $C_1$ to $C_k$ does not exceed a predetermined maximum transmit power of the user equipment, where k is a number of the one or more transmission channels and $P_{Ci}$ is the uplink transmit power of the transmission channel $C_i$, and configured to control the transmitter to perform uplink transmission through the one or more transmission channels $C_1$ to $C_k$ at the uplink transmit power $P_{C1}$ to $P_{Ck}$;

wherein the processor is configured to allocate the uplink transmit power $P_{C1}$ to $P_{Ck}$ for the one or more transmission channels $C_1$ to $C_k$ based on a predetermined priority order that includes, from highest priority to lowest priority, a hybrid automatic repeat request (HARQ) feedback channel, a fast feedback channel (FBCH), a ranging channel, a sounding channel, a data channel, and a bandwidth request channel.

5. The user equipment according to claim 4, wherein the processor is further configured to allocate a remaining uplink transmit power to another transmission channel of which priority order is lower than the one or more transmission channels $C_1$ to $C_k$, even when the remaining uplink transmit power corresponding to a difference in power between the predetermined maximum transmit power and the total uplink transmit power is less than a predetermined sufficient uplink transmit power of the another transmission channel, and to control the transmitter to perform uplink transmission through the another transmission channel at the remaining uplink transmit power simultaneously with the uplink transmission through the one or more transmission channels $C_1$ to $C_k$; and the processor is further configured to control the transmitter to perform the uplink transmission through the one or more transmission channels $C_1$ to $C_k$ only, when the another transmission channel is the HARQ feedback channel, the FBCH, the ranging channel or the bandwidth request channel and when the remaining uplink transmit power is less than the predetermined sufficient uplink transmit power of the another transmission channel.

6. The user equipment according to claim 4, wherein the processor is further configured to allocate a remaining uplink transmit power to another transmission channel of which priority order is lower than the one or more transmission channels $C_1$ to $C_k$ when the another transmission channel is the data channel, even when the remaining uplink transmit power corresponding to a difference in power between the predetermined maximum transmit power and the total uplink transmit power is less than a predetermined sufficient uplink transmit power of the another transmission channel, and to control the transmitter to perform uplink transmission through the another transmission channel at the remaining uplink transmit power simultaneously with the uplink transmission of the one or more transmission channels $C_1$ to $C_k$; and the processor is further configured to perform the uplink transmission through the one or more transmission channels $C_1$ to $C_k$ only, when the another transmission channel is the HARQ feedback channel, the FBCH, the ranging channel or the bandwidth request channel and when the remaining uplink transmit power is less than the predetermined sufficient uplink transmit power of the another transmission channel.

\* \* \* \* \*